United States Patent [19]

Mao et al.

[11] Patent Number: 5,180,772

[45] Date of Patent: Jan. 19, 1993

[54] NONWOVEN BINDERS OF VINYL ACETATE/ETHYLENE/SELF-CROSSLINKING MONOMER AND TETRAMETHYLOL GLYCOLURIL HAVING IMPROVED SHELF LIFE

[75] Inventors: Chung-Ling Mao, Emmaus; Joel E. Goldstein; John G. Iacoviello, both of Allentown, all of Pa.

[73] Assignee: Air Products and Chemicals, Inc., Allentown, Pa.

[21] Appl. No.: 317,234

[22] Filed: Feb. 28, 1989

[51] Int. Cl.$^5$ ............................................. C08L 31/04
[52] U.S. Cl. .......................... 524/816; 524/812; 524/458; 524/555; 524/512; 524/507
[58] Field of Search ............... 524/512, 507, 555, 458, 524/816, 812; 525/162, 163, 164

[56] References Cited

U.S. PATENT DOCUMENTS

| | | | |
|---|---|---|---|
| 3,380,851 | 4/1968 | Lindemann et al. | 117/140 |
| 4,064,191 | 12/1977 | Parekh | 260/850 |
| 4,442,257 | 4/1984 | Borovicka et al. | 524/555 |
| 4,444,941 | 4/1984 | Borovicka et al. | 524/507 |
| 4,487,889 | 12/1984 | Craun | 525/163 |
| 4,540,735 | 9/1985 | Borovicka, Sr. | 524/512 |
| 4,542,180 | 9/1985 | Carlson | 524/512 |
| 4,590,102 | 5/1986 | Rosamiltia | 427/374.1 |
| 4,608,410 | 8/1986 | Borovicka, Sr. | 524/512 |
| 4,683,260 | 7/1987 | Wickert | 524/512 |
| 4,728,680 | 3/1988 | Hahn, Jr. | 524/512 X |
| 4,774,283 | 9/1988 | Goldstein | 524/816 |
| 4,789,694 | 12/1988 | Hahn, Jr. | 524/512 X |
| 4,812,491 | 3/1989 | Hahn, Jr. | 524/512 X |
| 4,812,523 | 3/1989 | Toman | 524/512 X |
| 4,847,143 | 7/1989 | Watanabe et al. | 524/512 X |
| 4,853,422 | 8/1989 | Hahn, Jr. | 524/512 X |
| 4,956,401 | 9/1990 | Hahn, Jr. et al. | 524/512 X |

Primary Examiner—Joseph L. Schofer
Assistant Examiner—Jeffrey T. Smith
Attorney, Agent, or Firm—Keith D. Gourley; James C. Simmons; William F. Marsh

[57] ABSTRACT

Vinyl acetate/ethylene (VAE) copolymer emulsions having extended shelf life which are particularly suited for use as binders of nonwoven substrates. The copolymer emulsions are prepared by incorporating 1 to 45 wt % tetramethylol glycoluril, based on the amount of vinyl acetate in the copolymer, into an aqueous dispersion of a copolymer consisting essentially of 60 to 94 wt % vinyl acetate, 5 to 30 wt % ethylene and 1 to 10 wt % of a crosslinkable comonomer. Suitable crosslinking monomers include N-acrylamidoglycolic acid and N-methylol acrylamide. Nonwoven products formed by depositing the emulsion onto a nonwoven substrate exhibit significantly improved resistance to organic solvents.

7 Claims, No Drawings

NONWOVEN BINDERS OF VINYL ACETATE/ETHYLENE/SELF-CROSSLINKING MONOMER AND TETRAMETHYLOL GLYCOLURIL HAVING IMPROVED SHELF LIFE

TECHNICAL FIELD OF THE INVENTION

The present invention relates to binder compositions for nonwoven products comprising copolymerized vinyl acetate and ethylene.

BACKGROUND OF THE INVENTION

Emulsion copolymers prepared from vinyl acetate, ethylene and a crosslinkable comonomer are widely used as binders in the nonwovens industry. Unfortunately, these binders often have unacceptably short shelf-life and when applied to a nonwoven substrate exhibit unacceptable loss in strength in the presence of water and organic solvents. Such shortcomings limit the use of these formulations in many commercial and industrial applications. Consequently, the nonwovens industry has been searching for a binder prepared by a one-pot preparation which can overcome these limitations.

Numerous formulations have been developed in an effort to overcome problems associated with vinyl acetate/ethylene (VAE) emulsions. The most successful of the many chemistries employed is aminoplast technology wherein N-methylol acrylamide (NMA) or urea-formaldehyde (U/F) condensates are used as crosslinking agents. While these compounds are low in cost, compatible with aqueous emulsions and are rapidly cured under acid catalysis, their use is limited because they exhibit unacceptable resistance to solvents. Additionally, the cured products tend to exhibit inadequate adhesion to certain substrates, including metal, glass and synthetics such as mylar.

Most attempts at solving problems associated with diminished emulsion shelf life and low resistance of the bonded substrates from attack by organic solvents have been unsuccessful for a variety of reasons. For example, the inclusion of additional crosslinkable comonomer into the polymer premix improves binder performance until the comonomer content reaches a level wherein the crosslinkable monomer undergoes block polymerization. Use of melamine/formaldehyde resins fails because they are either unreactive under standard process operating temperatures or are too reactive with the functional latex thereby resulting in an emulsion having limited shelf life. Moreover, melamine/formaldehyde resins are typically unable to react to form oligomers which can bridge the binder to other chains of the binder or to the substrate.

U.S. Pat. No. 3,380,851 discloses a nonwoven binder comprising an interpolymer of vinyl acetate, ethylene and NMA wherein the interpolymer contains 5 to 40 wt % ethylene and 0.5 to 10 wt % NMA (based upon vinyl acetate).

U.S. Pat. No. 4,064,191 discloses a coating composition containing an alkylated glycoluril, a polymeric non-self-crosslinking compound and an acid catalyst. Suitable compositions comprise a blend of 2 to 50 wt % of the following components:

(A) a partially or fully alkylated glycoluril derivative such as tetramethylol glycoluril, a partially methylolated glycoluril, and the like;

(B) less than 25 wt % of an organic solvent soluble, normally non-self-crosslinking polymeric material having as reactive groups, any one or more of carboxyl groups, alcoholic hydroxyl groups or amide groups; and (C) from about 0.05 to 5.0 wt % of an acid catalyst based on the total weight of (A) and (B), wherein the reactive groups of (B) are heat reactive with (A) and wherein the percentages by weight of (A) and (B) total 100% and are based on the total solids weight of (A) and (B).

U.S. Pat. No. 4,442,257 teaches thermosetting low temperature cure coating compositions produced by combining certain emulsion polymers containing reactive hydroxyl groups, carboxyl groups, and acrylamide groups with dimethylol dihydroxy ethylene urea whereby the hydroxy groups crosslink with the dimethylol dihydroxy ethylene urea upon curing. Especially preferred are acrylamide polymers.

U.S. Pat. No. 4,444,941 discloses an acrylamide emulsion copolymer containing at least about 1.5% of a copolymerized N-alkylol amide as well as a carboxyl-containing monomer and a hydroxyl-containing monomer. The copolymerization of about 8 wt % monomers with other ethylenic monomers provides a reactive emulsion polymer adapted to be crosslinked with a glycoluril derivative upon moderate heat curing to form a cured coating composition. The acrylamide monomer, the carboxyl monomer, and the hydroxyl monomer are copolymerized together with other ethylenically unsaturated monomers in an aqueous emulsion polymerization process to produce a reactive emulsion polymer. A glycoluril derivative is added to the emulsion to provide a thermosetting emulsion mixture adapted to cure and crosslink upon application of moderate heat.

U.S. Pat. No. 4,487,889 discloses a protective surface coating composition containing a polymeric binder, the binder comprising on a weight basis; between 5% and 60% polyol containing two or more hydroxyl groups, between 2% and 60% of a glycoluril derivative and between 10% and 80% emulsion polymer, the emulsion polymer being emulsion copolymerized ethylenic monomers. The thermosetting composition can be cured to form a coating film. Column 4, lines 39–47 states that useful glycoluril derivatives include tetramethylol glycoluril, mono- and dimethylethers of dimethylol glycoluril, the trimethylether of tetramethylol glycoluril, tetrakishexoxymethyl glycoluril and the like.

U.S. Pat. No. 4,542,180 discloses an improved coating composition which comprises a coreactive polymeric mixture of a reactive emulsion polymer produced by copolymerizing ethylene monomers in the presence of a glycoluril derivative dispersed in water to provide an in-situ blend of reaction polymer and a glycoluril derivative. Glycoluril derivatives useful for practicing the invention include tetramethylol glycoluril, mono- and dimethylethers of dimethylol glycoluril, the trimethylether of tetramethylol glycoluril, tetrakishexoxymethyl glycoluril and the like. Upon curing, the glycoluril derivative crosslinks with the reactive in-situ formed emulsion polymer. Example 2 discloses a latex catalyzed by adding a 40% solution of para-toluenesulfonic acid in isopropanol equal to 6% of the weight of tetramethylol glycoluril solids. A latex of similar composition prepared by post addition of tetramethylol glycoluril did not form an acceptable film.

U.S. Pat. No. 4,647,611 discloses a process for preparing a nonwoven binder emulsion containing a crosslinkable vinyl acetate or vinyl acetate/ethylene copolymer prepared by polymerizing in an aqueous dispersion vinyl acetate, or vinyl acetate and ethylene in the presence of a crosslinkable comonomer of the formula:

R—NH—(—CH$_2$)$_n$—CH(OR$^1$)$_2$ wherein R is a C$_3$-C$_{10}$ olefinically unsaturated organic radical having functionality which renders the nitrogen atom electron deficient, R$^1$ is hydrogen or C$_1$-C$_4$ alkyl group and n is 3 or 4.

U.S. Pat. No. 4,774,283 discloses a copolymer emulsion for bonding nonwovens which comprises an aqueous medium having colloidally dispersed therein a copolymer consisting essentially of vinyl acetate, 1 to 20 wt % ethylene, 0.5-15 wt % (based on vinyl acetate) crosslinkable comonomer having the above-mentioned formula or N-acrylamidoglycolic acid, and 0.1 to 5 wt % of an acrylamide.

SUMMARY OF THE INVENTION

The present invention provides vinyl acetate/ethylene (VAE) copolymer emulsions having extended shelf life which demonstrate enhanced solvent resistance when deposited as a binder onto a nonwoven web of fibers. This improved solvent resistance is achieved by incorporating 1 to 45 wt % tetramethylol glycoluril (based on vinyl acetate) into the VAE copolymer emulsion.

Suitable copolymer emulsions are formed by the in-situ addition of tetramethylol glycoluril during the initial polymerization of vinyl acetate, ethylene and a self-crosslinking monomer or by post addition of tetramethylol glycoluril to the formed copolymer emulsion. These emulsions comprise an aqueous medium having colloidally dispersed therein a copolymer consisting essentially of from 60 to 94 wt % vinyl acetate, 5 to 30 wt % ethylene and 1 to 10 wt % of a crosslinkable comonomer. Suitable crosslinking comonomers for preparing these emulsions include N-acrylamidoglycolic acid, N-methylol acrylamide, acrylamidobutyraldehyde dimethyl acetal, methyl acrylamidoglycolate methyl ether and isobutoxymethylacrylamide. The copolymer emulsions have a Brookfield viscosity of 80 to 300 cps.

The copolymer emulsions of the invention can be applied to a nonwoven web of fibers to provide a bonded nonwoven substrate by curing the tetramethylol glycoluril-containing VAE copolymer under acidic conditions and heating. The amount of binder, calculated on a dry basis, applied to the fiber web is that amount sufficient to bind the fibers together to form a self-sustaining web and typically ranges from 3 to 100 wt % of the starting web.

DETAILED DESCRIPTION OF THE INVENTION

The present invention provides vinyl acetate/ethylene (VAE) copolymer emulsions having extended shelf life and enhanced solvent resistance when deposited as a binder onto a web of nonwoven fibers. These emulsions are prepared by incorporating 1-45 wt %, preferably 10-25 wt % tetramethylol glycoluril (based on vinyl acetate) into an aqueous medium containing a copolymer consisting essentially of from 60 to 94 wt % vinyl acetate, 5 to 30 wt % ethylene and 1 to 10 wt % of a crosslinkable comonomer.

Tetramethylol glycoluril is conveniently added in-situ during the initial polymerization of the vinyl acetate and ethylene or by post addition to the formed vinyl acetate/ethylene copolymer emulsion. Especially preferred are copolymers of vinyl acetate/ethylene/crosslinkable comonomer in which the copolymer contains 68 to 87.5 wt % vinyl acetate, 10 to 25 wt % ethylene, 2.5 to 7 wt % of a crosslinkable comonomer and the emulsion contains about 10 to 25 wt % tetramethylol glycoluril (based upon vinyl acetate). Copolymer emulsions which are useful as nonwoven binders have Brookfield viscosities ranging from 80 to 300 cps, and preferably 120 to 240 cps.

A method for preparing tetramethylol glycoluril is disclosed in U.S. Pat. No. 4,064,191. The compound can be prepared in high yield (approaching 90%) and is a crystalline solid having a melting point of 132°-136° C. Tetramethylol glycoluril is sold commercially by American Cyanamid Company, Wayne, New Jersey, under the tradename CYMEL® 1172 Resin and is represented by the formula:

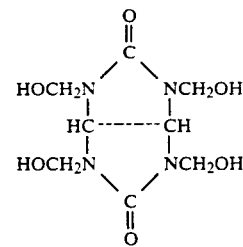

Tetramethylol glycoluril can be conveniently added to vinyl acetate/ethylene emulsion copolymers known in the art. Methods for preparing such copolymer emulsions include any of the customary procedures together with the incorporation of an ethylene pressure. Representative of suitable preparative methods include emulsion polymerization techniques described in chemistry texts such as POLYMER SYNTHESIS. Vol. I and II, by Stanley R. Sandler and Wolf Karo, Academic Press, New York and London (1974), and PREPARATIVE METHODS OF POLYMER CHEMISTRY, Second Addition, by Wayne R. Sorenson and Todd W. Campbell, Interscience Publishers (John Wiley & Sons), New York (1968).

In general, suitable vinyl acetate/ethylene copolymer emulsions can be prepared by the copolymerization of the monomers in the presence of suitable emulsifying agents, i.e., protective colloids and surfactants, in an aqueous medium under pressures generally not exceeding about 100 atm and in the presence of a redox system which is added incrementally, the aqueous system being maintained by a suitable buffering agent at a pH of about 2-6.

The process first involves a homogenation in which the vinyl acetate is thoroughly agitated in the presence of ethylene under the working pressure to effect solution of ethylene into the vinyl acetate while the reaction medium is gradually heated to the polymerization temperature. The homogenization period is followed by the polymerization period during which the redox system is added incrementally.

The crosslinking monomer may be added all at once with the vinyl acetate and ethylene or incrementally over the course of the polymerization reaction with the latter being preferred. Suitable crosslinking monomers including N-methylol acrylamide (NMA), N-acrylamidoglycolic acid (AGA), acrylamidobutyraldehyde dimethyl acetal (ABDA) and methyl acrylamidoglycolate methyl ether (MAGME). Preparation of vinyl acetate/ethylene copolymers employing AGA and NMA as crosslinking monomers are disclosed in U.S. Pat. No(s). 4,774,283 and 4,590,102, the specifications which are incorporated by reference herein. The preferred crosslinking monomers for making the emulsions of the present invention are AGA and NMA. From 1 to 10 wt %, and preferably 2.5 to 7 wt % of the crosslinking monomer is added into the reaction mixture.

Preferably, the polymerization reaction medium is adjusted to a pH of about 2.5 to decrease the water solubility of the AGA thereby preventing ionization of the AGA and allowing the maximum amount of AGA to be incorporated into the polymer.

The process of forming a vinyl acetate/ethylene copolymer emulsion generally comprises the preparation of an aqueous solution containing an emulsifying system and optionally, a buffering system. This aqueous solution and the initial or total charge of vinyl acetate are added to the polymerization vessel and ethylene pressure is applied to the desired value. The pressurized ethylene source can be shut off from the reactor so that the ethylene pressure decays as it is polymerized or can be kept open to maintain the ethylene pressure throughout the reaction. The latter procedure is commonly referred to as make-up ethylene.

The quantity of ethylene within the vinyl acetate/ethylene copolymer is influenced by the pressure, agitation and viscosity of the polymerization medium. The ethylene content of the copolymer can be increased by utilizing higher reaction pressures, greater agitation and/or lower viscosity.

As previously mentioned, the reaction mixture is thoroughly agitated to dissolve ethylene in the vinyl acetate and into the water phase. Conveniently, the charge is brought to polymerization temperature during this agitation period. The polymerization is then initiated by introducing initial amounts of the oxidant, the reductant having been added with the initial charge. After the polymerization has started, the oxidant and reductant are added incrementally as required to continue polymerization.

When reference is made to incremental addition, whether of vinyl acetate, crosslinkable comonomer, redox system or any other ingredient, continuous or intermittent, but preferably, uniform additions are contemplated. Such additions are also referred to as "delay" additions.

The vinyl acetate/ethylene copolymer emulsions of the present invention may optionally include one or more additional polyethylenically unsaturated copolymerizable monomers. Exemplary of such monomers which may be present from 0 to 0.5 wt %, preferably 0.05 to 0.25 wt %, are triallyl cyanurate, diallyl maleate, diallyl fumarate, hexanediol diacrylate, butylallyl maleate, allyl crotonate, vinyl acrylate, pentaerythritol triacrylate, vinyl methacrylate and the like.

Furthermore, 0.1 to 2 wt % sodium vinyl sulfonate or another polymerizable anionic surfactant, based on vinyl acetate, may be added to the emulsion to improve emulsion stability and to enhance fiber wetting and penetration of the binder into the fibers of the nonwoven substrate.

Catalytically effective amounts of various free-radical forming materials can be used in carrying out polymerization of the comonomers. Suitable materials include peroxide compounds such as peracetic acid, benzoyl peroxide, persulfate salts and azo compounds. Combination-type systems employing both reducing agents and oxidizing agents can also be used, i.e., a redox system. Suitable reducing agents or activators include bisulfites, sulfoxylates, alkyl metal bisulfite-ketone adducts and other compounds having reducing properties such as ascorbic acid, erythorbic acid and other reducing sugars.

Suitable oxidizing agents include hydrogen peroxide, organic peroxide such as tert-butyl hydroperoxide and the like and persulfates such as ammonium or potassium persulfate. The oxidizing agent is generally employed in an amount of 0.01 to 1%, preferably 0.05-0.5%, based on the weight percentage of vinyl acetate. The reducing agent is ordinarily added in the necessary equivalent amount.

Specific redox systems which can be used include hydrogen peroxide and zinc formaldehyde sulfoxylate or sodium formaldehyde sulfoxylate; and tert-butyl hydroperoxide with sodium bisulfite-acetone adduct. Other free radical forming systems that are well known in the art can also be used to polymerize the monomers.

Many of the well known emulsifying agents can be used including ionic and nonionic surfactants such as sodium lauryl sulfate, sodium sulfosuccinate esters and amides, sulfonated alkyl benzenes, alkylphenoxypolyethoxy ethanols and other polyoxyethylene condensates. The useful total amount of emulsifying agents typically ranges from 0.5 to 5% based on the aqueous phase of the emulsion regardless of solids content.

The reaction temperature can be controlled by the rate of redox addition and by the rate of heat dissipation via a reaction vessel water jacket. A mean temperature of about 50° C. is maintained during the polymerization of the monomers and temperatures much in excess of 80° C. should be avoided. While temperatures as low as 0° C. can be used, economically the lower temperature limit is about 30° C.

Reaction time will vary depending upon the temperature, the free radical forming source and the desired extent of polymerization to be achieved in preparing the emulsion. The reaction is typically continued until less than 0.5% of the vinyl acetate remains unreacted.

VAE copolymer emulsions can be produced having a solids content of 48% to 55% or more. Tetramethylol glycoluril can be conveniently blended by post-addition into any commercially available VAE copolymer binder emulsion and preferably to those containing N-methylol acrylamide or N-acrylamidoglycolic acid. Tetramethylol glycoluril can be added all at once or incrementally over the course of the blending operation with the latter being preferred. Commercially available emulsions include:

AIRFLEX ® 105 copolymer emulsion -vinyl acetate/ethylene/N-methylol-acrylamide.

AIRFLEX ® 109 copolymer emulsion -vinyl acetate/ethylene/N-methylol-acrylamide.

AIRFLEX is a registered trademark of Air Products and Chemicals, Inc. for copolymer emulsions.

The tetramethylol glycoluril-containing VAE copolymer emulsions of the present invention are particularly suited for use as binders in preparing nonwoven products such as paper towels, industrial wipes, baby wipes and adult washcloths. Equally superior results are obtained whether the tetramethylol glycoluril is reacted in-situ with the polymer premix or by post addition to the copolymer emulsion. Nonwoven products produced using the subject VAE copolymer emulsions exhibit substantially improved resistance to organic solvents such as methyl ethyl ketone (MEK), isopropyl alcohol, mineral spirits, perchloroethylene and toluene.

Nonwoven products can be prepared by a variety of methods known in the art which, in general, involve the impregnation of a loosely assembled web of fibers with the binder emulsion followed by a moderate heating to dry the web. The moderate heating also serves to cure the binder by forming a crosslinked interpolymer. Before the binder is applied, it is, of course, mixed with a suitable catalyst for the crosslinking monomer. For example, acid catalysts such as mineral acids, e.g., hydrogen chloride, or organic acids, e.g., para-toluenesulfonic acid, oxalic acid, or acid salts such as ammonium chloride are suitably used as is known in the art. The amount of catalyst typically ranges from 0.5 to 2% of the total emulsion copolymer.

The starting fiber layer or web can be formed by any one of the conventional techniques for depositing or arranging fibers in a web or layer. These techniques include carding, garnetting, air-laying, wet laying and the like. Individual webs or thin layers formed by one or more of these techniques can also be laminated to provide a thicker layer for conversion into a fabric. Typically, the fibers extend in a plurality of diverse directions in general alignment with the major plane of the fabric overlapping, intersecting and supporting other fibers to form an open, porous structure.

Typical fibers are formed from cellulose which contains predominantly $C_6H_{10}O_5$ groups. Examples of fibers suitable for use in the starting layer are natural cellulose fibers such as wood pulp, cotton and hemp and synthetic cellulose fibers such as rayon and regenerated cellulose. Often the fiber starting layer contains at least 50% cellulose fibers, whether they be natural or synthetic or a combination thereof. The fibers in the starting layer may also comprise natural fibers such as wool, jute, artificial fibers such as cellulose acetate, synthetic fibers such as polyamides, nylon, polyesters, acrylics polyolefins such as polyethylene, polyvinyl chloride, polyurethane and the like, alone or in combination with one another.

The fiber starting layer is subjected to at least one of several types of bonding operations to anchor the individual fibers together to form a self-sustaining web. One of the better known methods of bonding involves impregnating or printing the web with intermittent or continuous straight or wavy lines or areas of binder extending generally transversely or diagonally across the web and additionally, if desired, along the web.

The amount of copolymer binder, calculated on a dry basis, applied to the fiber starting web is that amount which is at least sufficient to bind the fibers together to form a self-sustaining web and suitably ranges from about 3 to about 100 wt % of the starting web, preferably from 10 to about 50 wt % of the starting web. The impregnated web is then dried and cured by passage through an air oven or the like and then through a curing oven. Typical conditions for achieving optimal crosslinking of the binder impregnated web of fibers include drying at 150° to 200° F. (66°-93° C.) for 4–6 minutes followed by curing at 300°-310° F. (149°-154° C.) for 3 to 5 minutes or more. However, other time-temperature relationships can be employed as is well known in the art.

Without being bound to a particular theory, the aminoplast functionalities of tetramethylol glycoluril are believed to react with the aminoplasts of the latex and the reactive hydroxyl groups of cellulose thereby providing substantially increased crosslink density. For example, tetramethylol glycoluril can react at one end with a polymer bound aminoplast having been crosslinked previously and at the other end to either a cellulosic hydroxyl group or a second polymer bound aminoplast. The performance improvements and extended shelf-life achieved by the tetramethylol glycoluril-containing binders of the present invention are superior to those achieved by typical melamine/formaldehyde resins.

Illustrative of nonwoven products which can be made by applying the binders of the present invention to nonwoven substrates or fiber webs include paper products, disposable diapers, sanitary napkins, underpads and surgical masks.

The following examples illustrate the preparation of VAE copolymer emulsions wherein tetramethylol glycoluril is reacted in-situ with the monomer premix and by post addition as a second stage addition to the copolymer emulsion.

EXAMPLE 1

IN-SITU ADDITION OF GLYCOLURIL INTO A VINYL ACETATE/ETHYLENE/NMA COPOLYMER

A 1 gallon reactor was charged with 926.5 g of deionized water, 159.0 g Polystep B27 surfactant, 0.1 g ferrous sulfate, 1 g sodium acetate, 2.0 g sodium formaldehyde sulfoxylate, 1.5 g acetic acid and 1450 g vinyl acetate and purged for 30 minutes with nitrogen. The kettle was heated to 50° C., agitated at 900 rpm, pressurized with ethylene to 625 lbs, and initiated by adding a 3.0% aqueous solution of t-butylhydroperoxide at 0.4 ml/min. Upon initiation, the activator delay (20.7% aqueous solution of sodium formaldehyde sulfoxylate) was begun at 0.4 ml/min. as was a 15.5% aqueous solution of NMA at 3.6 ml/min. [595 ml for 160 min.] and 135.0 g of Cymel 1172 resin (50% active). Rate of activator and catalyst delays were controlled to maintain an 8° C. exotherm. When the NMA delay was complete, the ethylene makeup was turned off. At the four hour mark, the vinyl acetate free monomer was 1.5% and the delays were turned off. Solids: 49.3%, viscosity: 154 cps.

EXAMPLE 2

POST ADDITION OF GLYCOLURIL INTO AIRFLEX 109 COPOLYMER EMULSION

A 1-gallon reactor was charged with 3,716 g of AIR-FLEX 109 copolymer emulsion. While under agitation, 310 g of Cymel 1172 resin were added into the reactor at a rate of 10 g/min. The agitator speed was increased to a speed of 100 rpm and agitation was maintained for a period of 60 min. The pH of the blend was then tested and adjusted if necessary to a pH of 5.3–6.0 by addition of a 7% solution of ammonium hydroxide. Solids: 51.3%, viscosity: 140 cps.

The following experimental procedure was utilized to test physical properties of nonwoven substrates impregnated with the tetramethylol glycoluril-containing VAE copolymer emulsions. The copolymer binder was applied to the substrate using the Atlas padding technique. The emulsions were initially diluted with deionized water to 9.0% solids and the pH was adjusted to 4.0 with ammonium chloride. Whatman #4 chromatography paper was saturated with the binder, the samples were dried, heated at 300° F. for five minutes and then subjected to tensile testing. The strips were immersed in solvent for three minutes and then placed in an Instron (2" jaw span, 1"/min. crosshead speed) for testing.

spectively). Airflex 109 VAE copolymer emulsions with high NMA content (9 wt % based upon vinyl acetate) and 30% Cymel 1172 resin exhibited good resistance to organic solvents including MEK as well as structural continuity.

TABLE 2

| RUN | SAMPLE COMPOSITION | TENSILE (pli) | | | | | | CYCLES TO FAILURE | |
|---|---|---|---|---|---|---|---|---|---|
| | | DRY | WET | MEK | MC | MS | IPA | PCE | FLAT | CREPED |
| 6 | A109/10% Cymel 303 resin | 57 | 37 | 32 | 34 | 46 | 32 | 35 | 8 | 13 |
| 7 | A109/9% NMA/13% Cymel 303 resin | 71 | 46 | 32 | 37 | 59 | 40 | 41 | 15 | 14 |
| 8 | A109/9% NMA/16% Cymel 303 resin | 83 | 42 | 31 | 34 | 61 | 41 | 44 | 11 | 14 |
| 9 | A109/9% NMA/10% Cymel 303 resin | 75 | 43 | 31 | 31 | 50 | 36 | 38 | 5 | 12 |
| 10 | A109/10% Cymel 1172 resin | 88 | 66 | 46 | 45 | 66 | 50 | 51 | 67 | 42 |
| 11 | A109/20% Cymel 1172 resin | 70 | 52 | 41 | 41 | 60 | 44 | 46 | 21 | 22 |
| 12 | A109/30% Cymel 1172 resin | 64 | 57 | 42 | 37 | 50 | 49 | 42 | 20 | 9 |
| 13 | A109/9% NMA/10% 1172/10% Cymel 303 | 65 | 39 | 33 | 32 | 47 | 36 | 35 | 11 | 20 |
| 14 | A109/9% NMA/20% 1172/5% Cymel 303 | 67 | 39 | 36 | 38 | 48 | 39 | 39 | 6 | 12 |
| 15 | A109/9% NMA/30% 1172/5% Cymel 303 | 67 | 40 | 32 | 42 | 54 | 42 | 43 | 6 | 10 |
| 16 | A109/9% NMA/30% Cymel 1172 resin | 94 | 64 | 42 | 43 | 73 | 51 | 49 | 21 | 32 |

A109 = AIRFLEX 109 copolymer emulsion
MEK = methyl ethyl ketone
MC = methylene chloride
MS = mineral spirits
IPA = isopropyl alcohol
PCE = perchloroethylene

EXAMPLE 3

Table 1 discloses results obtained by a web containing long (3.2 cm) polyester fibers impregnated with a tetramethylol glycoluril-containing VAE copolymer emulsion prepared by the post addition method according to Example 2. Emulsions were prepared containing from 0 to 30% Cymel 1172 resin and applied to the substrate according to the above-mentioned procedure. The results presented in Table 1 demonstrate that the post addition or blending of tetramethylol glycoluril into the VAE copolymer emulsion substantially improves the resistance of the substrate to loss of tensile strength upon subjecting the substrate to attack by water and methylethylketone (MEK). The ratio of MEK/dry tensile strengths increases from 41% to 66% upon the blending of 30% Cymel resin into the copolymer emulsion.

TABLE 1

| Run | % Cymel 1172 | TENSILES | | | |
|---|---|---|---|---|---|
| | | Dry pli | Wet pli | MEK pli | MEK/Dry (%) |
| 1 | 0 (Control) | 11.07 | 6.54 | 4.55 | 41 |
| 2 | 4 | 11.15 | 7.19 | 6.13 | 54 |
| 3 | 7 | 10.90 | 7.00 | 6.18 | 56 |
| 4 | 10 | 11.79 | 7.84 | 5.68 | 48 |
| 5 | 30 | 10.02 | 7.66 | 6.65 | 66 |

MEK = methyl ethyl ketone

Table 2 discloses tensile results for Runs 6-16 obtained by applying Airflex 109 VAE copolymer emulsion containing Cymel 1172 resin and Cymel 303 resin (a melamine/formaldehyde) onto a cellulosic substrate. Each emulsion was prepared according to the post-addition procedure disclosed in Example 2. The Runs containing Cymel 303 resin performed poorly relative to those Runs blended with Cymel 1172 resin as to dryer adhesion, hand, appearance and tensile. The results demonstrate that VAE copolymer emulsions blended with 10% Cymel 1172 resin exhibited dry, wet and MEK tensiles of 88, 66 and 46 oz/in., respectively. Moreover, the substrate impregnated with this composition exhibited superior physical integrity (67 and 42 cycles to failure for the flat and creped substrates, re-

EXAMPLE 4

Table 3 illustrates data pertaining to the shelf life/stability of Airflex 109 emulsion blended with tetramethylol glycoluril. Cymel 1172 resin was blended into Airflex 109 emulsion, the mixture was split into Runs 17, 19, 21 and 23 and adjusted to the disclosed ph values. A day later, the pH of these samples were readjusted to 6.0. Additionally, Runs 18, 20 and 22 were adjusted to the designated pH and then blended with Cymel 1172 resin. A day later, these samples were readjusted to pH 6.0. The data demonstrate that no significant change in viscosity was observed in Runs 17-23 with the viscosity of Runs 17, 19, 21 and 23 remaining stable during the 24 hour period prior to pH readjustment. Runs 24 and 25 present viscosity data for Airflex 109 emulsion containing Cymel 1172 and Cymel 303, a melamine/formaldehyde resin, respectively. After 7 days at room temperature, the viscosity of the melamine/formaldehyde-containing material (Run 25) increased from 560 cps to 1870 cps while the viscosity of the tetramethylol-containing emulsion (Run 24) remained stable. Premature crosslinking is not induced at room temperature in VAE copolymer emulsions containing tetramethylol glycoluril and such emulsions are stable enjoying excellent shelf life at a pH ranging from 3.5 to 5.3.

TABLE 3

| Run | Initial pH | Initial Viscosity | 24-hour Viscosity | 7-Day Viscosity | After pH Raised to 6.0 |
|---|---|---|---|---|---|
| 17 | 3.5 | 105 | 114 | | 90 |
| 18 | 3.5 | 100 | 108 | | 92 |
| 19 | 4.0 | 105 | 110 | | 94 |
| 20 | 4.0 | 95 | 106 | | 96 |
| 21 | 4.0 | 100 | 105 | | 98 |
| 22 | 4.5 | 95 | 106 | | 96 |
| 23 | 5.3 | 160 | 168 | | 173 |
| 24 | 3.5 | 132 | | 150 | |
| 25* | 6.0 | 560 | | 1870 | |

*Contains Cymel 303

EXAMPLE 5

Swell data is presented in Table 4 for Airflex 109 emulsion modified by post addition of Cymel 1172 resin and Cymel 303 resin, a tetramethylol glycoluril and a melamine/formaldehyde, respectively. The emulsions were then impregnated onto Whatman #4 chromatography paper and subjected to methylethyl ketone for 90 minutes. The swell index, defined as the weight of the swelled impregnated substrate divided by the weight of dry impregnated substrate, for the enumerated formulations demonstrate that as the level of external crosslinker increases, the swell ratio decreases. The largest improvement occurs at low levels of added external crosslinker. The emulsions prepared with Cymel 1172 resin provide higher MEK tensile strengths than obtained by use of Cymel 303 resin.

TABLE 4

Effect of Level of External Crosslinker

| Run | Emulsion | Swell Index | Dry Tensile | MEK Tensile |
|---|---|---|---|---|
| 26 | A-109 Control | 1.51 | 11.7 | 5.6 |
| 27 | 95% A-109/ 5% CYMEL 303 | 1.33 | 11.7 | 6.3 |
| 28 | 90% A-109/ 10% CYMEL 303 | 1.16 | 12.0 | 6.3 |
| 29 | A-109 Control | 3.90 | 15.9 | 5.7 |
| 30 | 95% A-109/5% CYMEL 1172 | 2.70 | 16.2 | 6.4 |
| 31 | 90% A-109/ 10% CYMEL 1172 | 2.40 | 15.8 | 6.4 |
| 32 | 70% A-109/ 30% CYMEL 1172 | 1.40 | 15.1 | 7.0 |

A-109 = AIRFLEX 109

EXAMPLE 6

Table 5 discloses tensile results for Runs 33-37 obtained by applying Airflex 109 VAE copolymer emulsion containing Cymel 1170 resin (a fully butylated glycoluril), Cymel 1171 resin (Glycoluril containing an unknown ratio of ethyl and methyl groups) and Cymel 1172 resin onto a cellulosic substrate. Each emulsion was prepared according to the post-addition procedure disclosed in Example 2. The results demonstrate that the substrate impregnated with the Cymel 1172-containing emulsion of Run 37 exhibited the greatest tensile strength after being subjected to methyl ethyl ketone. Runs 34 and 35 demonstrate that VAE copolymer emulsions containing Cymel 1170 and 1171 resins exhibited substantially lower tensile strength than Run 33, the control which did not contain an external crosslinking agent, when subjected to methyl ethyl ketone. These results show that glycoluril derivatives disclosed in the art, particularly in the references cited herein, do not provide the unexpectedly improved performance achieved by adding tetramethylol glycoluril into VAE copolymer emulsions. In fact, Runs 34 and 35 illustrate that the addition of a fully butylated glycoluril and a glycoluril derivative containing an unknown ratio of ethyl and methyl groups into a VAE copolymer emulsion actually decreases the tensile strength of the impregnated substrate when placed in contact with methyl ethyl ketone.

TABLE 5

Effect of Level of External Crosslinker

| Run | Emulsion | Dry Tensile | Wet Tensile | MEK Tensile |
|---|---|---|---|---|
| 33 | A-109 Control | 14.3 | — | 9.3 |
| 34 | 85% A-109/ 15% CYMEL 1170 | 12.0 | — | 7.1 |
| 35 | 85% A-109/ 15% CYMEL 1171 | 13.5 | — | 7.0 |
| 36 | A-109 Control | 14.9 | 7.7 | 8.8 |
| 37 | 90% A-109/ 10% CYMEL 1172 | 14.9 | 8.7 | 9.6 |

A-109 = Airflex 109 copolymer emulsion

The data demonstrate that VAE copolymer emulsions modified by the in-situ or post-addition of tetramethylol glycoluril exhibit extended pot life and enhanced solvent resistance when applied as a binder onto a web on nonwoven fibers. Additionally, unlike copolymer emulsions disclosed in the prior art, for example, U.S. Pat. No. 4,542,180, acceptable films can be formed by the post addition of tetramethylol glycoluril into the disclosed VAE copolymer emulsions.

STATEMENT OF INDUSTRIAL APPLICATION

The invention provides vinyl acetate/ethylene copolymer emulsions containing tetramethylol glycoluril which are useful as binders in the preparation of nonwoven products.

What is claimed is:

1. A copolymer-emulsion comprising an aqueous medium having colloidally dispersed therein a copolymer consisting essentially of 60 to 94 wt % vinyl acetate, 5 to 30 wt % ethylene and 1 to 10 wt % of a crosslinkable comonomer and 1 to 45 wt % tetramethylol glycoluril based upon the amount of vinyl acetate in the copolymer.

2. The copolymer emulsion of claim 1 wherein the crosslinkable comonomer is selected from the group consisting of N-acrylamidoglycolic acid, N-methylol acrylamide, acrylamidobutyraldehyde dimethyl acetal, methyl acrylamidoglycolate methyl ether and isobutoxymethylacrylamide.

3. The copolymer emulsion of claim 1 comprising 10 to 25 wt % tetramethylol glycoluril based upon the amount of vinyl acetate in the copolymer.

4. The copolymer of claim 1 wherein the crosslinkable comonomer is N-acrylamidoglycolic acid.

5. The copolymer emulsion of claim 2 wherein the copolymer contains 10 to 25 wt % ethylene.

6. The copolymer emulsion of claim 2 wherein the copolymer contains 2.5 to 7 wt % crosslinkable comonomer.

7. The copolymer of claim 1 wherein the crosslinkable comonomer is N-methylol acrylamide.

* * * * *